(12) United States Patent
Tachibana

(10) Patent No.: US 10,046,233 B2
(45) Date of Patent: Aug. 14, 2018

(54) GAME MACHINE CONTROLLER

(75) Inventor: Tatsunori Tachibana, Tokyo (JP)

(73) Assignee: UNIVERSAL ENTERTAINMENT CORPORATION, Tokyo (JP)

( * ) Notice: Subject to any disclaimer, the term of this patent is extended or adjusted under 35 U.S.C. 154(b) by 269 days.

(21) Appl. No.: 11/474,457

(22) Filed: Jun. 26, 2006

(65) Prior Publication Data

US 2007/0021210 A1    Jan. 25, 2007

(30) Foreign Application Priority Data

Jul. 21, 2005    (JP) .................................. 2005-211089

(51) Int. Cl.
| | | |
|---|---|---|
| *A63F 13/00* | (2014.01) | |
| *A63F 13/245* | (2014.01) | |
| *A63F 13/211* | (2014.01) | |
| *A63F 13/98* | (2014.01) | |
| *A63F 13/20* | (2014.01) | |

(52) U.S. Cl.
CPC ............ *A63F 13/245* (2014.09); *A63F 13/02* (2013.01); *A63F 13/06* (2013.01); *A63F 13/211* (2014.09); *A63F 2300/105* (2013.01); *A63F 2300/204* (2013.01); *A63F 2300/206* (2013.01); *A63F 2300/8076* (2013.01)

(58) Field of Classification Search
CPC ..... A63F 13/211; A63F 13/837; A63F 13/245
USPC .......................................... 463/1, 2, 36, 37
See application file for complete search history.

(56) References Cited

U.S. PATENT DOCUMENTS

| | | | | |
|---|---|---|---|---|
| 4,895,376 A | * | 1/1990 | Chiang Shiung-Fei | .......... 463/2 |
| 6,248,017 B1 | * | 6/2001 | Roach | .............................. 463/37 |
| 6,328,650 B1 | * | 12/2001 | Fukawa et al. | ................. 463/36 |
| 6,545,661 B1 | * | 4/2003 | Goschy | ................... A63F 13/04 |
| | | | | 345/158 |
| 6,929,543 B1 | * | 8/2005 | Ueshima | ................. A63F 13/06 |
| | | | | 273/148 B |
| 2001/0031662 A1 | * | 10/2001 | Larian | .............................. 463/36 |
| 2003/0186742 A1 | * | 10/2003 | Lin | ......................... A63F 13/04 |
| | | | | 463/37 |

FOREIGN PATENT DOCUMENTS

JP    2002-346224    12/2002

* cited by examiner

*Primary Examiner* — David L Lewis
*Assistant Examiner* — Eric M Thomas
(74) *Attorney, Agent, or Firm* — Lex IP Meister, PLLC

(57) ABSTRACT

A game machine controller includes: an exterior portion formed in the shape of a gun; a trigger which is formed in the form of a part protruding from the exterior portion; a signal output device which outputs a shooting input signal in response to the operation of the trigger by a player; a transmission interface which transmits the shooting input signal output from the signal output device; and a direction sensor which is provided within the exterior portion, and which detects the direction of the exterior portion. The signal output device transmits a direction detection signal to the mobile game machine via the transmission interface based upon the direction detected by the direction sensor, which allows a CPU to create game image data used for instructing a display monitor to display a new game image.

12 Claims, 13 Drawing Sheets

FIG. 10
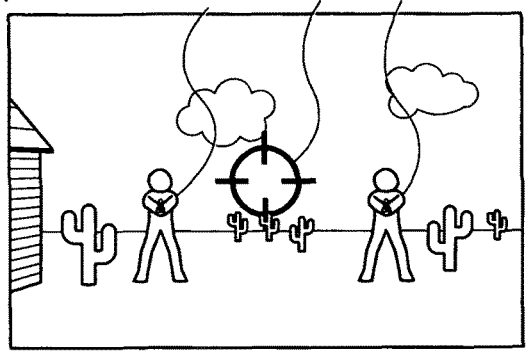
(1) IMAGE A 15b  16  15a
(θ DEGREE TURN COUNTERCLOCKWISE) ↓
(θ DEGREE TURN CLOCKWISE) ↓
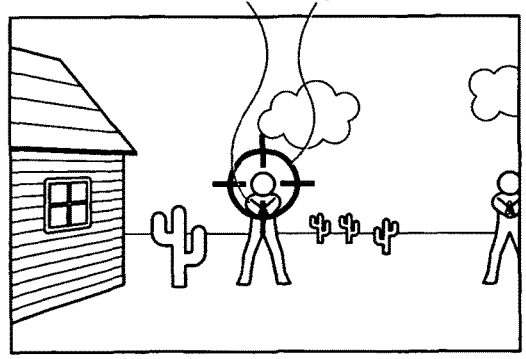
(2) IMAGE B  15b 16
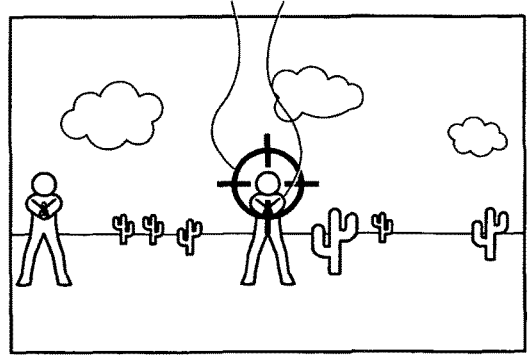
(3) IMAGE C  16 15a

GAME MACHINE CONTROLLER

This application is based on and claims the benefit of priority from Japanese Patent Application No. 2005-211089, filed on 21 Jul. 2005, the content of which is incorporated herein by reference.

BACKGROUND OF THE INVENTION

Field of the Invention

The present invention relates to a game machine controller.

Related Art

There are known conventional shooting game controllers that allow a player to control a simulated gun to shoot at a target displayed on a game screen.

Examples of such known shooting game controllers include a shooting game controller which operates together with a game machine that displays a shooting screen on a raster scanning monitor, and which allows the player to instruct the game machine to shoot at a desired target by operating a trigger (see Patent Document 1, for example). Such a shooting game controller has a function of transmitting the target position information to the game machine. This allows the game machine to make precise detection of the target at which the player has aimed, in order to advance the game.

[Patent Document 1]

Japanese Unexamined Patent Application Publication No. 2002-346224

SUMMARY OF THE INVENTION

Problem to be Solved by the Invention

However, with such a shooting game controller, the player controls the controller so as to aim at a target which is displayed on a fixed monitor. This restricts the player's range of movement while controlling the controller. In some cases, this leads to the feeling of the game being insufficient for the player. Furthermore, the image that is displayed has no connection to the movements of the player during the course of the game. This leads to the game being insufficiently realistic for the player.

It is an object of the present invention to provide a game machine controller that offers a game with an improved feel and with improved realism.

The present invention has been made in view of the aforementioned problems. The present invention provides a controller for a mobile game machine including: a locking mechanism which is provided to the exterior portion, and which allows the mobile game machine to be fitted thereto at a predetermined position; and an acceleration sensor which is provided within the exterior portion, and which detects the acceleration of the exterior portion. With such an arrangement, the signal output device transmits a direction detection signal to the mobile game machine via the transmission interface based upon the direction detected by the direction sensor, which allows the game image creating unit to create the game image data used for instructing the display monitor to display a new game image. Also, an arrangement may be made including another kind of sensor instead of the direction sensor, which detects the movement of the gunbarrel such as a change in the position thereof, rotation thereof, etc.

More specifically, the present invention provides the following arrangements.

(1) The present invention provides a game machine controller for controlling a mobile game machine (e.g., mobile game machine 11 etc., described later) including a CPU (e.g., CPU 24, etc., described later) for creating game image data (e.g., game image data, etc., described later) and a display monitor (e.g., LCD 14, etc., described later) for displaying a game image (e.g., an image which is to be displayed on the LCD 14 described later, and which includes a target 15 and a shooting sight 16 described later) based upon the game image data created by the CPU. The game machine controller comprises: an exterior portion (e.g., mobile game machine controller 1, gunbarrel 6, etc., described later) formed in the shape of a gun; a trigger (e.g., trigger 3, etc., described later) provided in the form of a part that protrudes from the exterior portion, which can be operated by a player; a signal output device (e.g., CPU 22, etc., described later) which outputs a shooting input signal (e.g., shooting input signal, etc., described later) in response to the operation of the trigger by the player; a transmission interface (e.g., communication port 9, etc., described later) which transmits the shooting input signal output from said signal output device; a locking mechanism (e.g., T-shaped groove 4, first locking mechanism, second locking mechanism, etc., described later) which is provided to the exterior portion, and which allows the mobile game machine to be fitted thereto at a predetermined position (e.g., T-shaped groove 4, etc., described later); and a direction sensor (e.g., direction sensor 10, etc., described later) which is provided within the exterior portion, and which detects the direction of the exterior portion (e.g., the direction of the gunbarrel 6, etc., described later). With such an arrangement, the signal output device transmits a direction detection signal (e.g., direction detection signal, etc., described later) to the mobile game machine via the transmission interface based upon the direction detected by the direction sensor, which allows the CPU to create game image data used for instructing the display monitor to display a new game image.

According to such an aspect of the present invention as described in (1), the direction sensor detects the direction of the exterior portion which changes corresponding to the movements of the player. On the other hand, the signal output device transmits a direction detection signal to the mobile game machine via the transmission interface based upon the direction thus detected by the aforementioned direction sensor, which allows the CPU to create game image data used for instructing the display monitor to display a new game image. With such an arrangement, the mobile game machine displays images corresponding to the movements of the player during the progress of the game, for example. This can provide a game with improved realism. Furthermore, such an arrangement provides a game with the player holding the game machine controller, to which the mobile game machine has been mounted, by hand. This can provide a game without restricting the player's range of movement while controlling the game machine controller, thereby improving the feel of the game. Furthermore, with such an arrangement, the mobile game machine and the game machine controller are provided in the form of separate units. This can provide a game machine controller having a function of mounting multiple kinds of mobile game machines, unlike a game machine controller connected to a particular game machine.

(2) The present invention provides a game machine controller for controlling a mobile game machine (e.g., mobile game machine 11 etc., described later) including a CPU (e.g., CPU 24, etc., described later) for creating game image data (e.g., game image data, etc., described later) and a display monitor (e.g., LCD 14, etc., described later) for displaying a game image (e.g., an image which is to be displayed on the LCD 14 described later, and which includes a target 15 and a shooting sight 16 described later) based upon the game image data created by the CPU. The game machine controller comprises: an exterior portion (e.g., mobile game machine controller 1, gunbarrel 6, etc., described later) formed in the shape of a gun; a trigger (e.g., trigger 3, etc., described later) provided in the form of a part that protrudes from the exterior portion, which can be operated by a player; a signal output device (e.g., CPU 22, etc., described later) which outputs a shooting input signal (e.g., shooting input signal, etc., described later) in response to the operation of the trigger by the player; a transmission interface (e.g., communication port 9, etc., described later) which transmits the shooting input signal that is output from the signal output device; a locking mechanism (e.g., T-shaped groove 4, first locking mechanism, second locking mechanism, etc., described later) which is provided to the exterior portion, and which allows the mobile game machine to be fitted thereto at a predetermined position (e.g., T-shaped groove 4, etc., described later); and an acceleration sensor (e.g., acceleration sensor, etc, described later) which is provided within the exterior portion, and which detects the acceleration of the exterior portion (e.g., the acceleration of the gunbarrel 6, etc., described later). With such an arrangement, the signal output device transmits an acceleration detection signal (e.g., acceleration detection signal, etc., described later) to the mobile game machine via the transmission interface based upon the acceleration detected by the acceleration sensor, which allows the CPU to create game image data used for instructing the display monitor to display a new game image.

According to such an aspect of the present invention as described in (2), the acceleration sensor detects the acceleration of the exterior portion which changes corresponding to the movements of the player. On the other hand, the signal output device transmits an acceleration detection signal to the mobile game machine via the transmission interface based upon the acceleration thus detected by the aforementioned acceleration sensor, which allows the CPU to create game image data used for instructing the display monitor to display a new game image. With such an arrangement, the image data is controlled based upon the change in the acceleration, whereby the mobile game machine displays images corresponding to the movements of the player during the progress of the game, for example. This can provide a game with improved realism. Furthermore, such an arrangement provides a game with the player holding the game machine controller, to which the game machine has been mounted, by hand. This can provide a game without restricting the player's range of movement while controlling the game machine controller, thereby improving the feel of the game. Furthermore, with such an arrangement, the mobile game machine and the game machine controller are provided in the form of separate units. This can provide a game machine controller which mounts multiple kinds of game machines, unlike a game machine controller connected to a particular mobile game machine.

BRIEF DESCRIPTION OF THE DRAWINGS

FIG. 10 is a diagram which shows the relation between the movements of the player and the images displayed on an LCD;

DETAILED DESCRIPTION OF THE INVENTION

Figure 1:
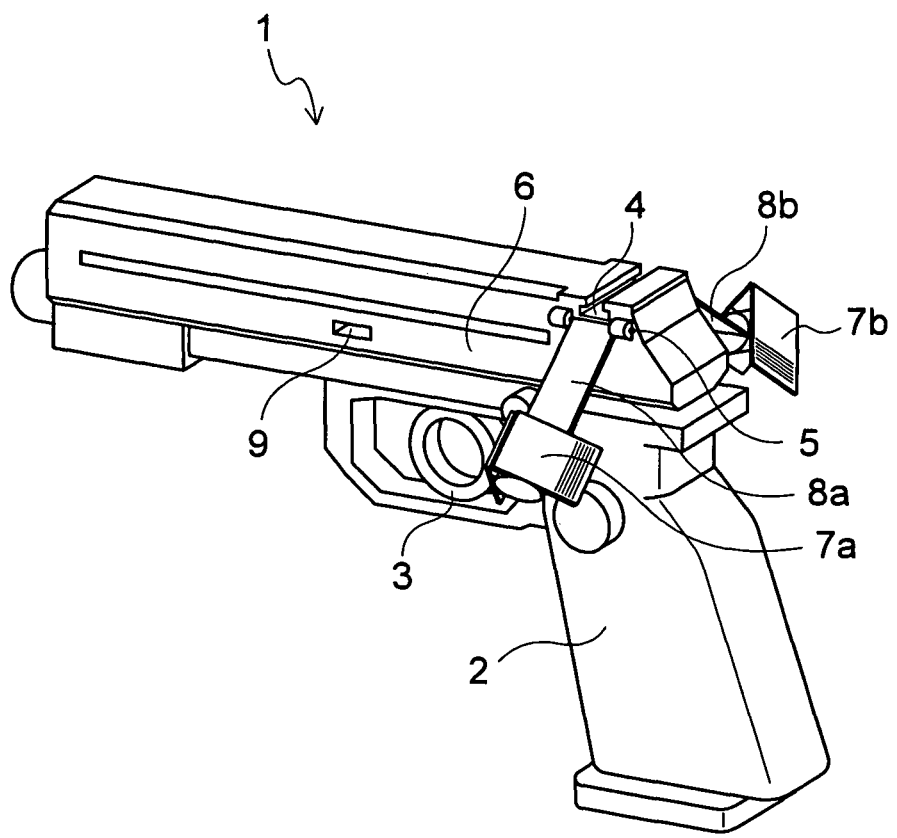
FIG. 1 is a perspective view which shows the exterior of a mobile game machine controller.

FIG. 1 is a perspective view which shows the exterior of a mobile game machine controller 1 according to an embodiment of the present invention.

The mobile game machine controller 1 comprises: a grip 2 for being gripped by the player in one hand or by both hands; a trigger 3 provided so as to protrude from the inside of the mobile game machine controller 1; a T-shaped groove 4 for mounting a game cartridge 17 described later; a pair of swing plates 8a and 8b which are connected to a gunbarrel 6, and able to rotate by way of swing pins 5; clips 7a and 7b for holding a mobile game machine 11 described later; and a communication port 9 which allows the mobile game machine controller 1 to be connected to, and to communicate with, the mobile game machine 11 described later.

Furthermore, the gunbarrel 6 includes a direction sensor 10 (not shown) therewithin for detecting the direction of the gunbarrel 6. The direction sensor 10 may comprise a geomagnetic sensor, a gyro sensor, or the like. Also, an arrangement may be made including an acceleration sensor instead of the direction sensor 10, thereby enabling the acceleration of the gunbarrel 6 to be detected. Also, the gunbarrel 6 may include any sensor therewithin, instead of the direction sensor or the acceleration sensor, which detects the movement of the gunbarrel 6 such as change in the position thereof, rotation thereof, etc. Description will be made below in the present embodiment regarding an arrangement in which the direction sensor 10 comprises a geomagnetic sensor.

The direction sensor 10 comprises two geomagnetic sensors disposed perpendicular to one another. The direction sensor 10 calculates the angle of the gunbarrel 6 with respect to magnetic north based upon the magnetic field detection values detected by these two geomagnetic sensors. The angle thus obtained can be employed as the direction of the gunbarrel 6. A CPU 22 described later transmits a direction detection signal corresponding to the direction of the gunbarrel 6 thus obtained using the direction sensor 10, to the mobile game machine 11 in order to advance a shooting game described later.

Figure 2:
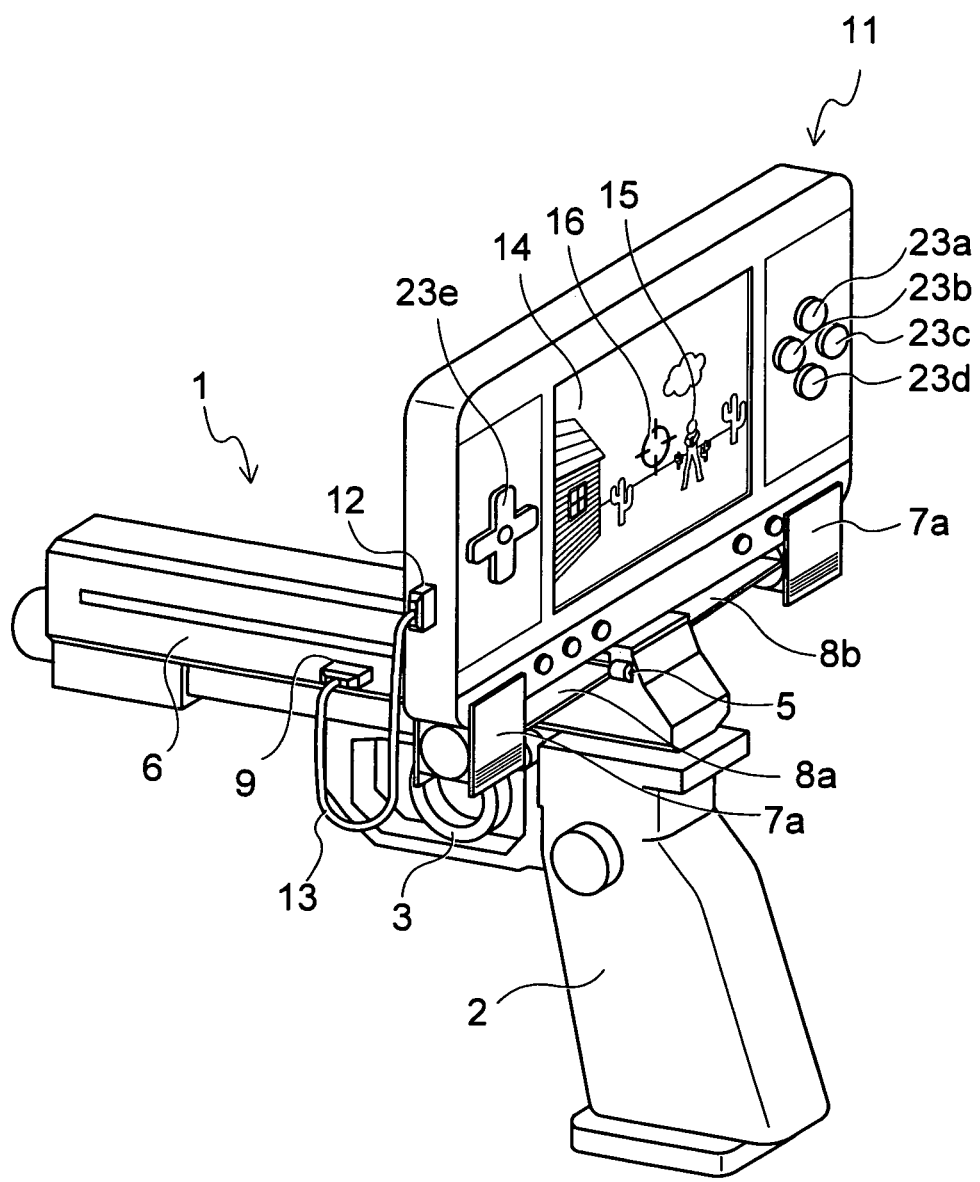
FIG. 2 is a perspective view which shows the mobile game machine controller and a mobile game machine.

Description will be made regarding an arrangement in which a shooting game is executed employing the mobile game machine controller 1 with reference to FIG. 2.

In order to execute a shooting game, the mobile game machine 11 is mounted on the mobile game machine controller 1. In this stage, the communication port 9 of the mobile game machine controller 1 and a communication port 12 of the mobile game machine 11 are connected with each other via a communication cable 13. Furthermore, the lower portion of the mobile game machine 11 is held by the pair of clips 7a and 7b, whereby the mobile game machine 11 is fixed to the mobile game machine controller 1.

The mobile game machine 11 includes an LCD 14 displays an image with respect to a shooting game. For example, the LCD 14 displays an image including a target 15 at which the player is to aim in a shooting game, a shooting sight 16 used for aiming at the target, etc.

The player plays a shooting game by controlling the mobile game machine controller 1 with the grip 2 of the mobile game machine controller 1 being held in one hand or by both hands. Specifically, the mobile game machine controller 1 allows the player to control the direction of the gunbarrel 6, which is detected by the direction sensor 10, by changing the position of his or her body while holding the mobile game machine controller 1 in his or her hand, or by changing the direction of the gunbarrel 6 of the mobile game machine controller 1. With such an arrangement, the image displayed on the LCD 14 changes corresponding to the change in the direction of the gunbarrel 6.

For example, the player can change the direction of the gunbarrel 6 such that the shooting sight 16 aligns with the target 15 in an image displayed on the LCD 14. In cases in which the player operates the trigger 3 in such a state in which the shooting sight 16 is aligned with the target 15 in an image displayed on the LCD 14, a CPU 24 described later determines that the result is a hit. In this case, the LCD 14 displays an image showing the target 15 hit by a bullet falling down (which will be referred to as "hit image" hereafter), and the score of the player is added to.

On the other hand, in cases in which the player operates the trigger 3 in a state in which the shooting sight 16 is not aligned with the target 15 in an image displayed on the LCD 14, the CPU 24 described later determines that the result is a miss. In this case, the LCD 14 displays an image showing the target 15 launching a counterattack (which will be referred to as "damage image" hereafter), and the damage points of the player are added to. In a case that the score of the player has reached a predetermined value, the player clears this stage, or alternatively, the player clears the game, whereupon the game ends. On the other hand, in cases in which the damage points have reached a predetermined value, the game is over, whereupon the game ends. The term "stage" as used here represents a game space classified according to the kind of background of the image displayed in the shooting game. Examples of such stages include a desert, the inside of a building, outer space, etc.

Figure 3:
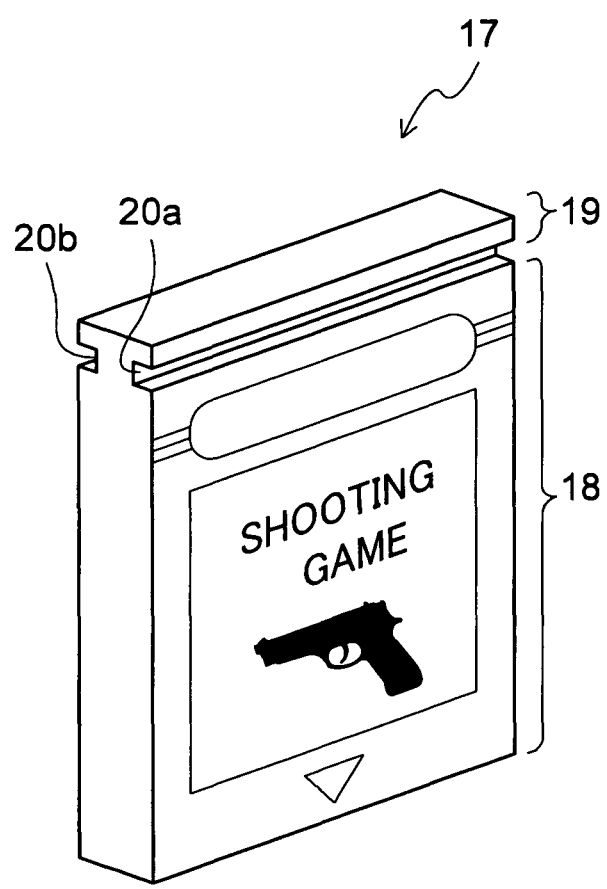
FIG. 3 is a perspective view which shows the exterior of a game cartridge.

A description will be made regarding the game cartridge 17 with reference to FIG. 3.

The game cartridge 17 stores program data, various kinds of image data described later, etc., used for executing a shooting game. Upon a mobile game machine insertion portion 18 being inserted into an insertion opening provided to the mobile game machine 11, which is described later, the game cartridge 17 and the mobile game machines 11 are electrically connected with each other. This allows the CPU 24 provided to the game machine 11, which is described later, to read or write data to and from the game cartridge 17.

Furthermore, a T-shaped groove insertion portion 19 is provided to the upper end of the game cartridge 17, which allows the game cartridge 17 to be mounted to the mobile game machine controller 1. The T-shaped insertion portion 19 has grooves 20a and 20b formed thereon. The game cartridge 17 can be mounted to the mobile game machine controller 1 by inserting the T-shaped insertion portion 19 to the T-shaped groove 4.

A description will be made regarding a procedure for mounting the mobile game machine 11 to the mobile game machine controller 1, and of a locking mechanism for mounting and fixing the mobile game machine 11 to the mobile game machine controller 1, with reference to FIGS. 4 through 7.

Figure 4:
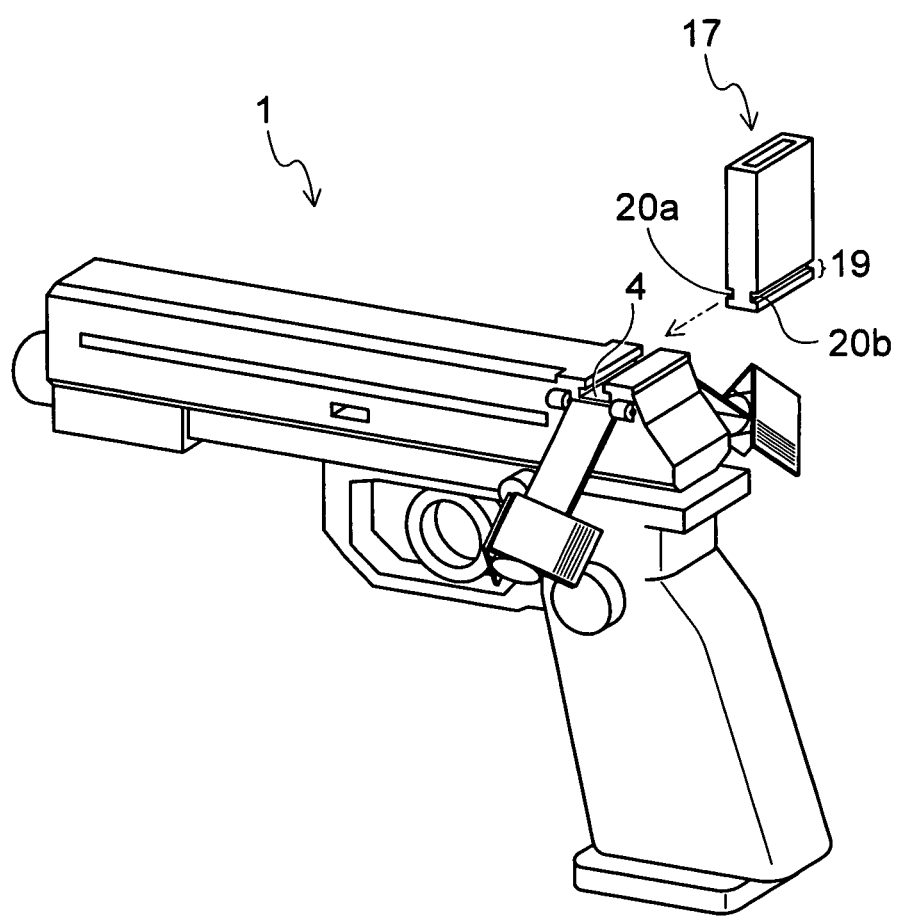
FIG. 4 is a diagram which shows a procedure for mounting the mobile game machine to the mobile game machine controller.

FIG. 4 shows a first step for mounting the mobile game machine 11 to the mobile game machine controller 1. In this step 1, the T-shaped insertion portion 19 of the game cartridge 17 is inserted into the T-shaped portion 4 of the mobile game machine controller 1 by sliding the T-shaped groove insertion portion 19 in the direction along which the grooves 20a and 20b extend. In this step, the game cartridge 17 is mounted to the mobile game machine controller 1.

Figure 5:
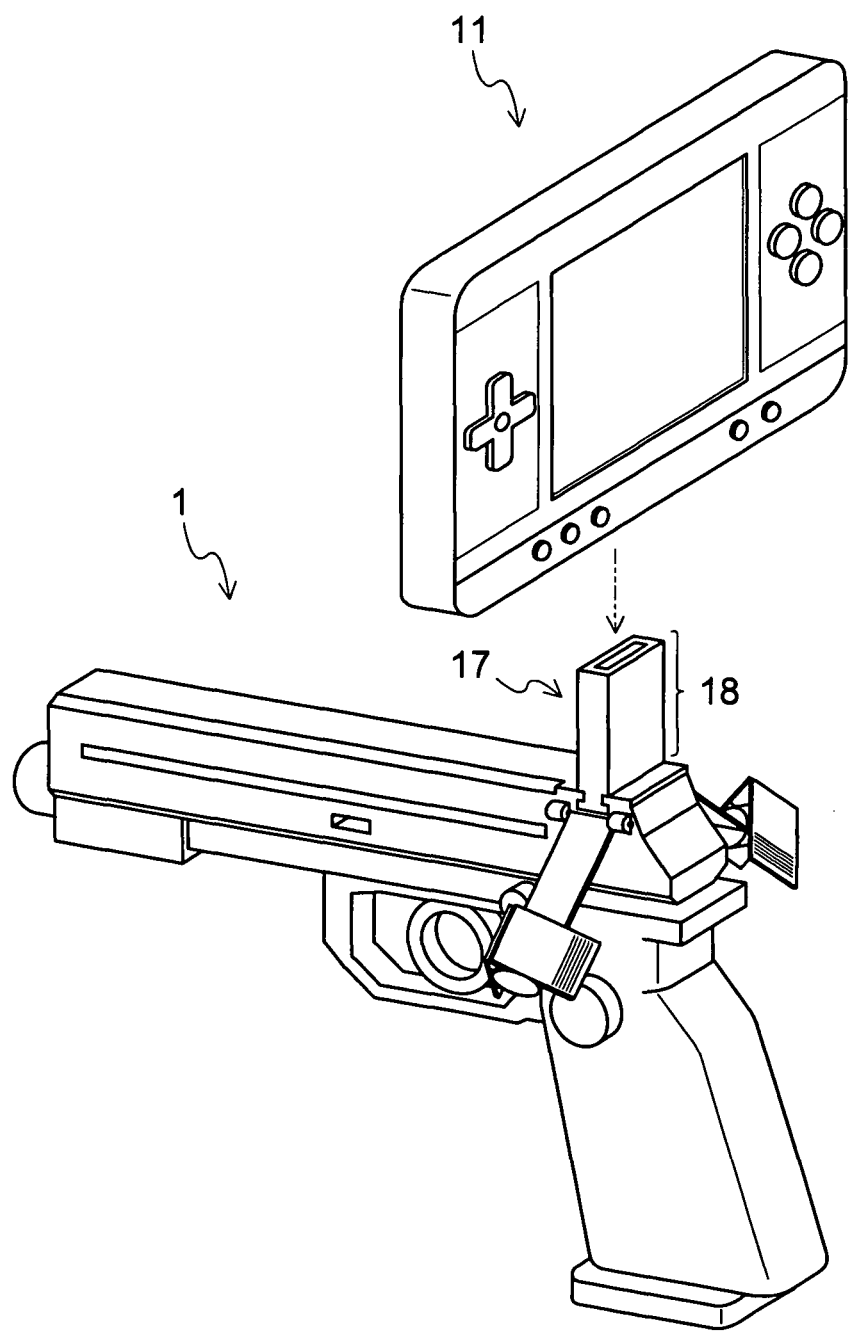
FIG. 5 is a diagram which shows a procedure for mounting the mobile game machine to the mobile game machine controller.

FIG. 5 shows a second step for mounting the mobile game machine 11 to the mobile game machine controller 1. In this step, the mobile game machine insertion portion 18 of the game cartridge 17 fixed to the mobile game machine controller 1 is inserted into an insertion opening (not shown) provided to the rear face of the mobile game machine 11. In this step, the mobile game machine 11 is mounted to the mobile game machine controller 1 through the game cartridge 17. Such a mechanism for mounting the mobile game machine 11 to the mobile game machine controller 1 through the game cartridge 17 will be referred to as "first locking mechanism" hereafter.

Figure 6:
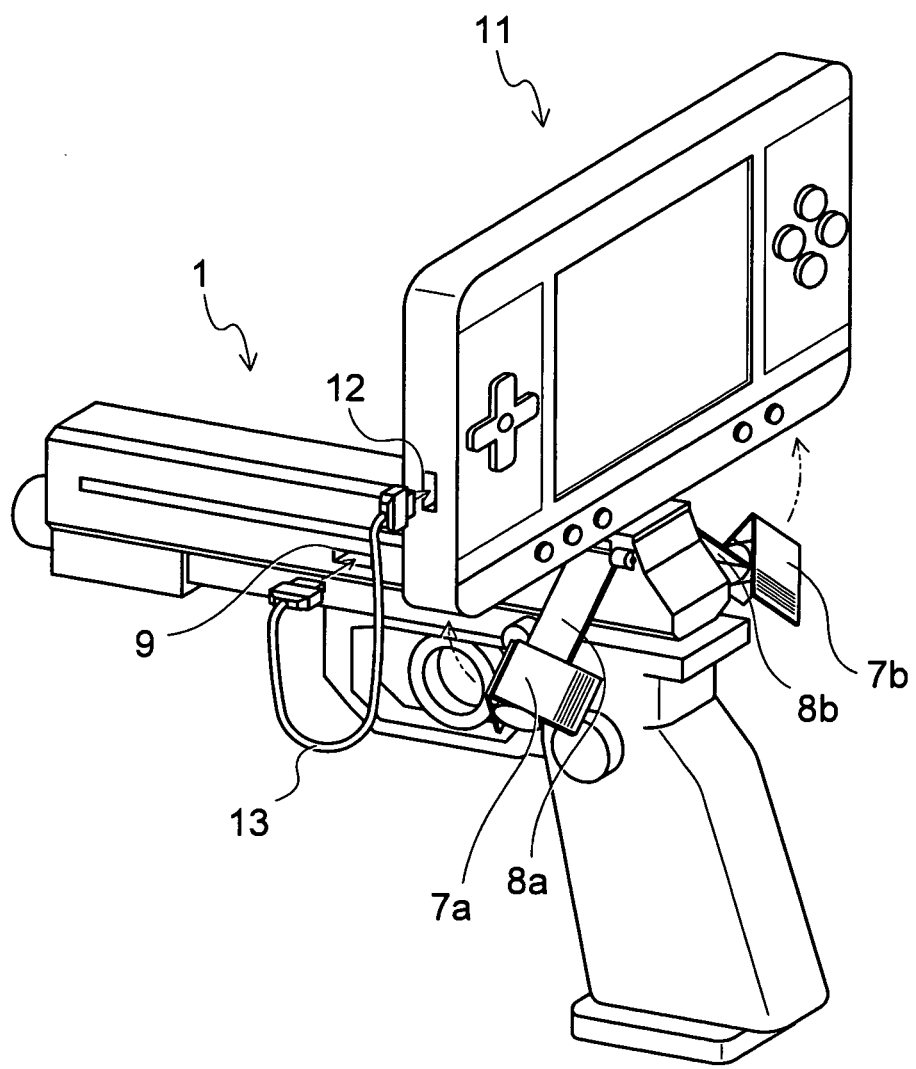
FIG. 6 is a diagram which shows a procedure for mounting the mobile game machine to the mobile game machine controller.

FIG. 6 shows a third step for mounting the mobile game machine 11 to the mobile game machine controller 1. In this step, both terminals of the communication cable 13 are connected to the communication port 9 of the mobile game machine controller 1 and the communication port 12 of the mobile game machine 11, respectively. Furthermore, after the swing plates 8a and 8b of the mobile game machine controller 1 are turned, the mobile game machine 11 is held by the clips 7a and 7b, whereby the mobile game machine 11 and the mobile game machine controller 1 are connected with each other through the swing plates 8a and 8b. This allows the mobile game machine 11 mounted to the mobile game machine controller 1 to be fixed thereto. Such a mechanism for fixing the mobile game machine 11 to the mobile game machine controller 1 through the clips 7a and 7b provided to the swing plates 8a and 8b which hold the mobile game machine 11 will be referred to as "second locking mechanism" hereafter.

Figure 7:
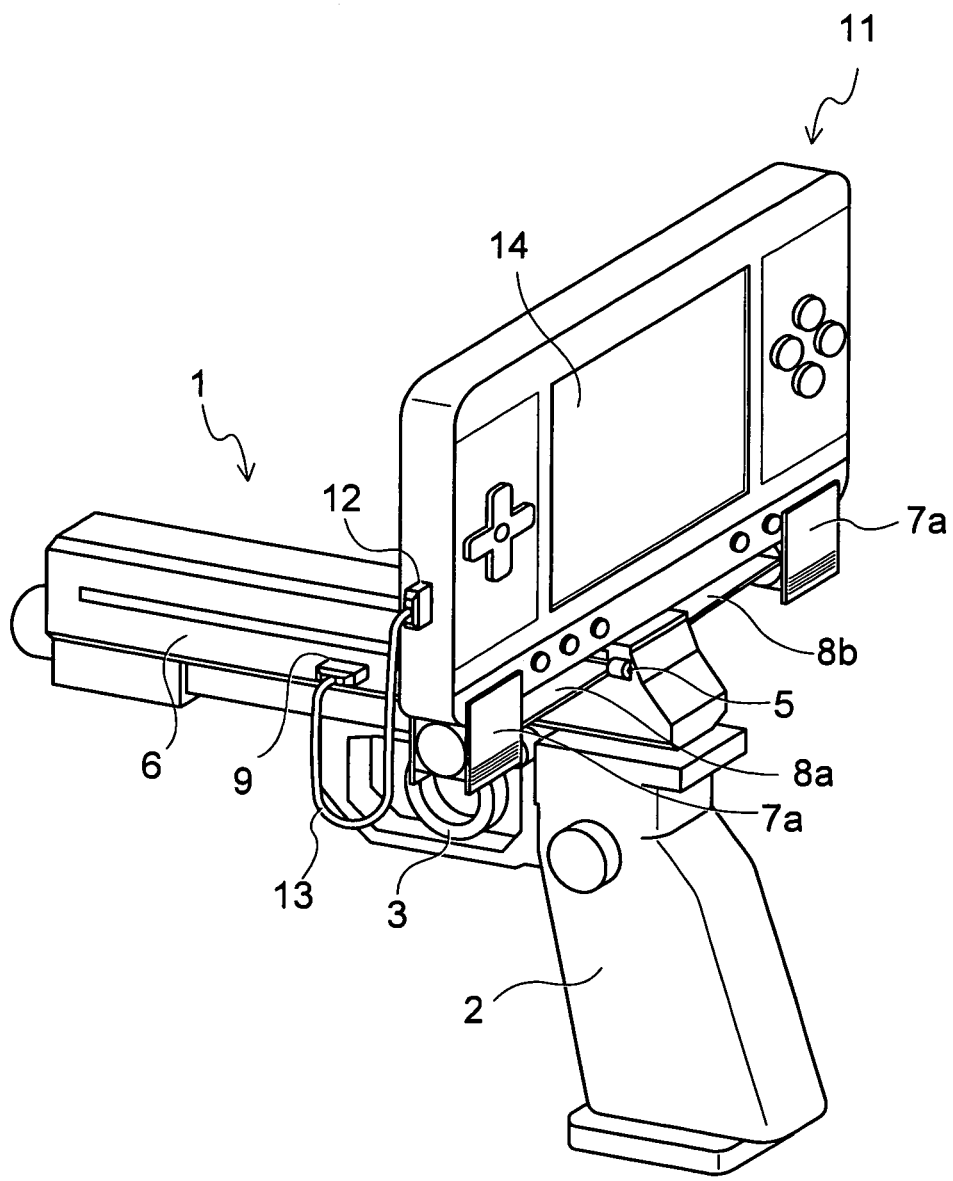
FIG. 7 is a diagram which shows a procedure for mounting the mobile game machine to the mobile game machine controller.

FIG. 7 shows a state after the mobile game machine 11 has been mounted to the mobile game machine controller 1. In this state, the mobile game machine 11 is mounted on and fixed to the mobile game machine controller by means of the first locking mechanism and the second locking mechanism.

With such an arrangement, before execution of the shooting game, the game cartridge 17 is required to be inserted into the insertion opening of the mobile game machine 11. The first locking mechanism allows the mobile game machine 11 to be mounted to the mobile game machine controller 1 at the same time as this required operation. This provides a mobile game machine controller to which the mobile game machine 11 can be mounted in a simple manner.

The mobile game machine 11 can be mounted to the mobile game machine controller 1 through the first locking mechanism alone. However, let us consider cases in which a certain amount of force is applied to the mobile game machine 11 mounted to the mobile game machine controller 1 in a particular direction. In some cases, such an application of force leads to the mobile game machine 11 becoming undesirably detached from the mobile game machine controller 1. In order to solve the aforementioned problem, the present embodiment has the second locking mechanism in addition to the first locking mechanism. This allows the mobile game machine 11 to be fixed to the mobile game machine controller 1 in a sure manner.

Figure 8:
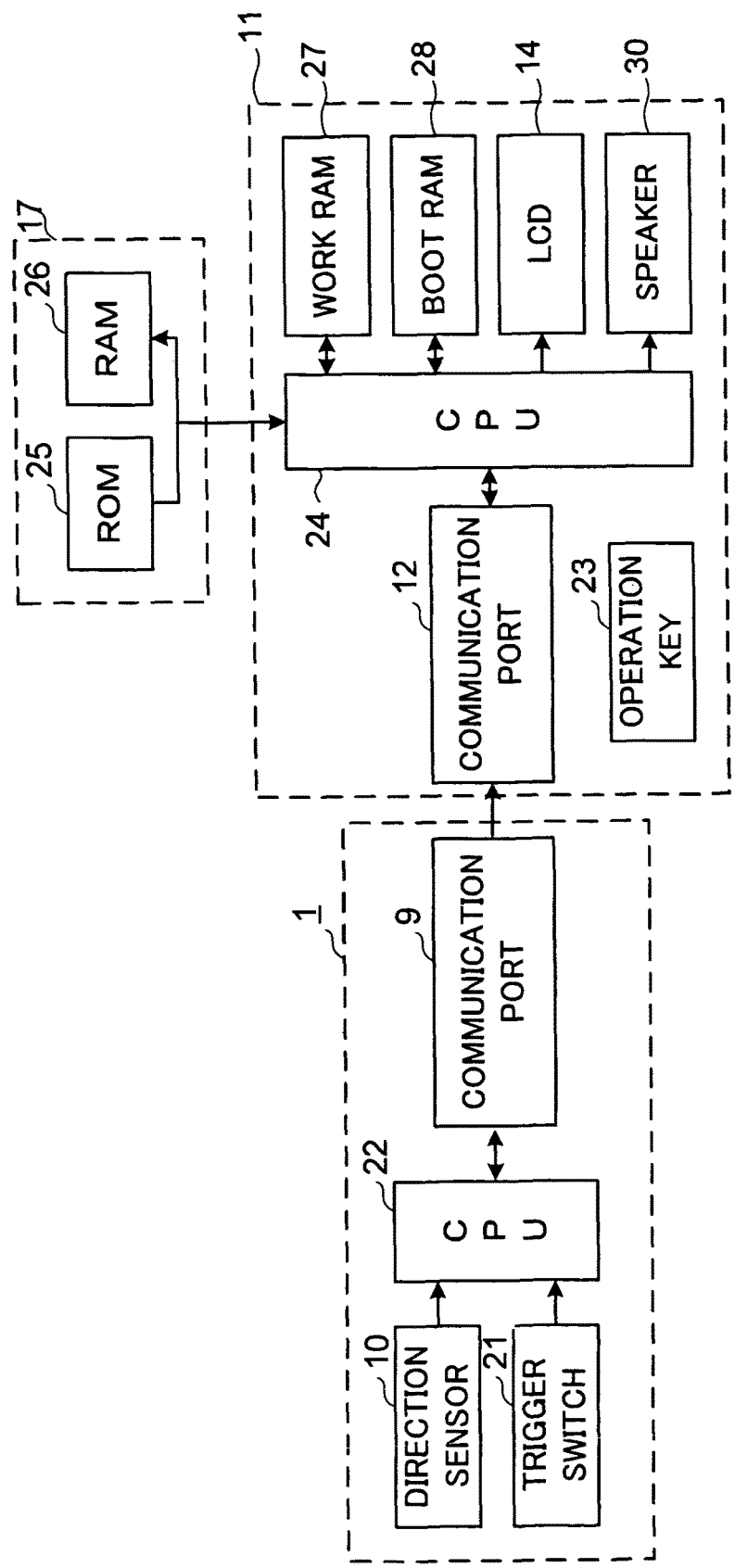
FIG. 8 is a diagram which shows a functional block configuration.

Description will be made with reference to FIG. 8 regarding a functional block configuration of an arrangement comprising the mobile game machine controller 1, the mobile game machine 11, and the game cartridge 17, which is necessary for implementing the present invention.

The mobile game machine controller 1 includes the direction sensor 10, a trigger switch 21, the CPU 22, and the communication port 9.

The direction sensor 10 detects the magnitude of the magnetic field, and transmits a magnetic field detection value signal to the CPU 22, which allows the direction of the gunbarrel 6 of the mobile game machine controller 1 to be computed (angle of the gunbarrel 6 with respect to magnetic north).

The trigger switch 21 transmits a trigger operation signal to the CPU 22 corresponding to the operation of the trigger 3 by the player.

Upon reception of a signal from the direction sensor, the CPU 22 calculates the direction of the gunbarrel 6 of the mobile game machine controller 1 based upon the magnetic field detection value included in this signal, and transmits the direction detection signal, which has been obtained based upon the direction thus calculated, to the communication port 12. On the other hand, upon reception of an operation signal from the trigger switch 21, the CPU 22 transmits a shooting input signal to the communication port 12.

The communication port 9 allows the direction detection signal and the shooting input signal received from the CPU 22 to be transmitted to the communication port 12 of the mobile game machine 2, which will be described later, via the communication cable 13.

The game cartridge 17 includes ROM 25 and RAM 26.

The ROM 25 stores game program data, stage image data, target image data, hit image data, damage image data, etc., used in the execution of the shooting game. The CPU 24 controls readout or writing of data to and from the ROM 25. The stage image data is used for creating the background of an image displayed on the LCD 14 in the shooting game (e.g., a part of the image which comprises buildings, trees, clouds, etc.). The stage image data is provided for each stage. On the other hand, the target image data is used for creating an image of the target 15 at which the player is to aim in the shooting game. The hit image data is used for creating a hit image. The damage image data is used for creating a damage image.

The RAM 26 stores backup data. The CPU 24 described later reads and writes data to and from the RAM 26. Examples of backup data thus stored include: data input by the player; history of the past games; etc.

The mobile game machine 11 includes the communication port 12, an operation key 23, the CPU 24, work RAM 27, boot ROM 28, the LCD 14, and a speaker 30.

The communication port 12 allows the direction detection signal and the shooting input signal to be received from the communication port 9 of the mobile game machine controller 1, and to be transmitted to the CPU 24 described later, via the communication cable 13.

The operation key 23 transmits an operation signal to the CPU 24 described later, in response to the operation of the operation key 23 by the player.

At the time of activation of the mobile game machine 11, the CPU 24 performs initialization processing described later according to a boot program stored in the boot ROM 28 described later. Furthermore, the CPU 24 executes a shooting game program stored in the ROM 25 of the game cartridge 17. Furthermore, the CPU 24 reads out the stage image data and the target image data stored in the ROM 25 of the game cartridge 17, and stores these data sets in the work RAM 27 described later.

Furthermore, the CPU 24 creates game image data based upon the stage image data and the target image data stored in the work RAM 27 according to the direction detection signal and shooting input signal received via the communication port 12 or the operation signal received from the operation key 23. Then, the CPU 24 instructs the LCD 14 to display an image based upon the game image data. Furthermore, the CPU 24 transmits an audio signal to the speaker 30.

Here, the ROM 25 of the game cartridge 17 stores the stage image data and target image data in the form of three-dimensional image data. Specifically, the stage image data includes data with respect to the shape, the position, etc., of each object such as a building, tree, etc., positioned in a virtual three-dimensional space. On the other hand, the target image data includes data with respect to the shape, the position, etc., of each target 15 positioned in a virtual three-dimensional space. The CPU 24 determines the direction of the line of sight from a given point of view in a virtual three-dimensional space based upon the direction of the gunbarrel 6 calculated based upon the direction detection signal. Then, the CPU 24 projects each of the objects and the targets 15 onto a plane corresponding to the aforementioned point of view, thereby creating game image data.

The work RAM 27 is used as a temporary storage unit, which is a work area for allowing the CPU 24 to execute the shooting game program. Also, the work RAM 27 stores various kinds of information such as stage image data, etc. The CPU 24 controls readout and writing of data to and from the work RAM 27.

The boot ROM 28 stores a boot program (startup program) etc., for initializing the work RAM 27, the resistors of the CPU 24, etc., of the mobile game machine 11. The CPU 24 controls readout of data from the boot ROM 28.

The LCD 14 displays an image based upon the game image data created by the CPU 24.

The speaker 30 outputs audio based upon the audio signal received from the CPU 24.

A description will be made with reference to FIG. 9 regarding the relation between the movements of a player 31 and the direction of the gunbarrel 6 of the mobile game machine controller 1 calculated based upon the magnetic field detection value signal output from the direction sensor 10.

Figure 9:
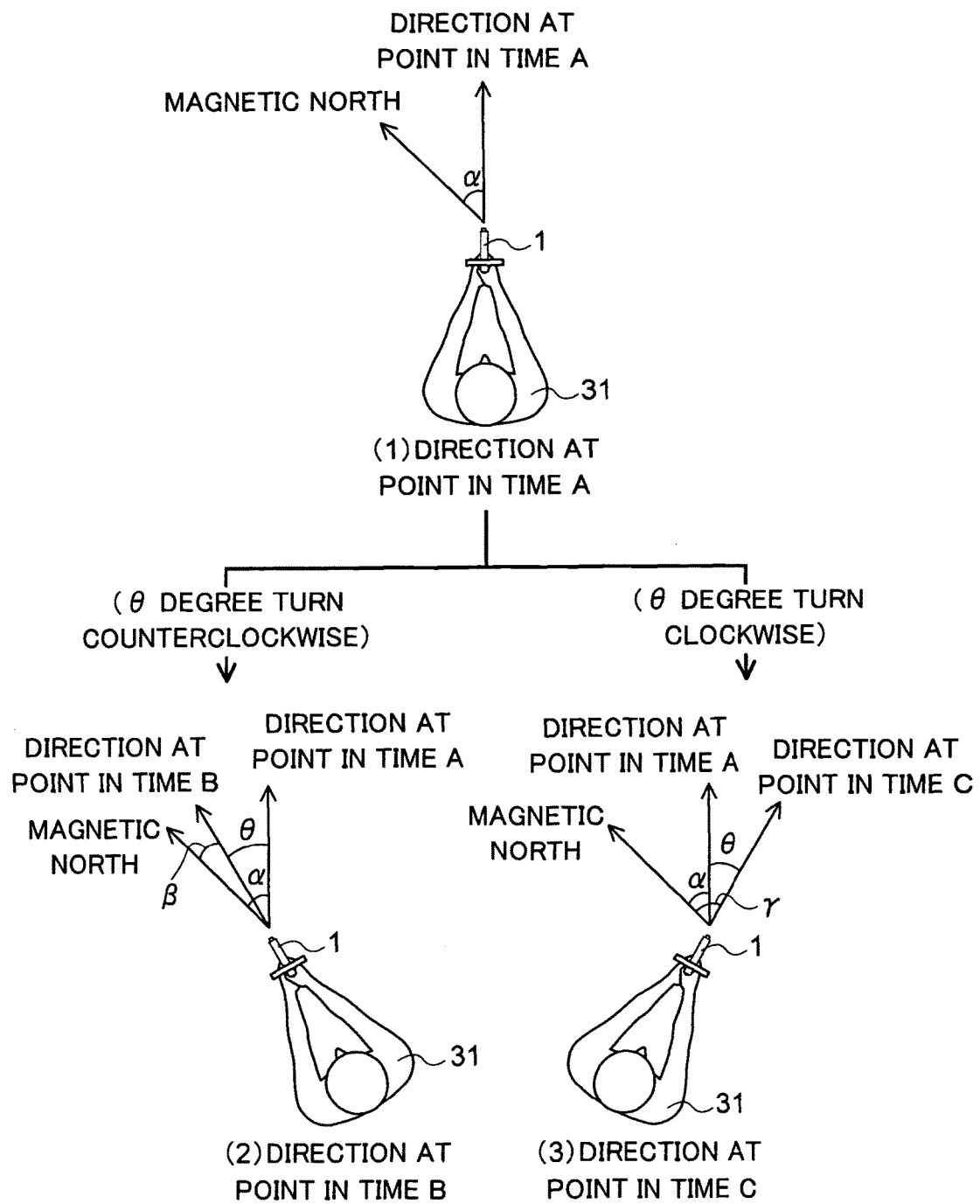
FIG. 9 is a diagram which shows the relation between the direction of a gunbarrel and the movements of the player.

Region (1) in FIG. 9 shows the direction of the gunbarrel 6 at the point in time A before the movement of the player 31. At the point in time A, the direction of the gunbarrel 6 calculated based upon the output of the direction sensor 10, i.e., the angle of the gunbarrel 6 with respect to magnetic north, is represented by α.

Region (2) in FIG. 9 shows the direction of the gunbarrel 6 at the point in time B after the player 31 has turned counterclockwise by θ (degrees), using the direction of the gunbarrel 6 at the point in time A as a reference point. At the point in time B, the direction of the gunbarrel 6 calculated based upon the output of the direction sensor 10, i.e., the angle of the gunbarrel 6 with respect to magnetic north is represented by β. The angle β matches the angle obtained by subtracting the angle θ, the amount by which the player has turned, from the angle α.

Region (3) in FIG. 9 shows the direction of the gunbarrel 6 at the point in time C after the player 31 has turned clockwise by θ (degrees), using the direction of the gunbarrel 6 at the point in time A as a reference point. At the point in time C, the direction of the gunbarrel 6 calculated based upon the output of the direction sensor 10, i.e., the angle of the gunbarrel 6 with respect to magnetic north is represented by γ. The angle γ matches the angle obtained by adding the angle θ, the amount by which the player has turned, to the angle α.

As described above, upon the player 31 turning while the mobile game machine controller 1 is being held in the player's hand, the direction of the gunbarrel 6, which is calculated based upon the output of the direction sensor 10, changes corresponding to the angle θ, which is the amount by which the player 31 has turned. Note that, upon the player 31 moving his or her wrists or the like while the mobile game machine controller 1 is being held by hand, the direction of the gunbarrel 6, which is calculated based upon the output of the direction sensor 10, changes in the same manner.

Description will be made regarding the relation between the movements of the player in the shooting game and an image displayed on the LCD 14 of the mobile game machine 11, with reference to FIG. 10.

Region (1) in FIG. 10 shows an image A. The image A is an example of an image displayed on the LCD 14 of the mobile game machine 11 at the point in time A before the movement of the player, which corresponds to the direction (angle A) of the gunbarrel 6 shown in region (1) in FIG. 9. The image A thus shown includes the shooting sight 16, a target 15a, and a target 15b.

Region (2) in FIG. 10 shows an image B. The image B is an example of an image displayed on the LCD 14 of the mobile game machine 11 after the player has turned counterclockwise by θ (degrees), using the point in time A as a reference point, which corresponds to the direction (angle β) of the gunbarrel 6 shown in region (2) in FIG. 9. The shooting sight 16 is superimposed upon the target 15b in the vicinity of the center of the image B. In cases in which the player operates the trigger 3 in such a state, in which the image B is thus displayed, the CPU 24 determines that the shot is a hit. Then, the score of the player is added to, and a hit image is displayed.

Region (3) in FIG. 10 shows an image C. The image C is an example of an image displayed on the LCD 14 of the mobile game machine 11 after the player has turned clockwise by θ (degrees), using the point in time A as a reference point, which corresponds to the direction (angle γ) of the gunbarrel 6 shown in region (3) in FIG. 9. The shooting sight 16 is superimposed upon the target 15a in the vicinity of the center in the image C. In a case that the player operates the trigger 3 in such a state, in which the image C is thus displayed, the CPU 24 determines that the shot is a hit. Then, the score of the player is added to, and a hit image is displayed.

As described above, such an arrangement allows the player to aim at the target 15a and the target 15b, with the displayed image changing corresponding to the change in the direction of the gunbarrel 6 which has been effected by the player turning the gunbarrel 6. With such an arrangement, the movements of the player match those that would occur if the player were handling a real gun. That is to say, such an arrangement can provide a game with the feel of having handling a real gun. Furthermore, with such an arrangement, the image is displayed based upon the three-dimensional image data such as the stage image data etc., and changes in a three-dimensional manner corresponding to the movement of the player turning. This can provide a realistic game in which the player has the illusion of looking down the sight provided to a real gun.

Figure 11:
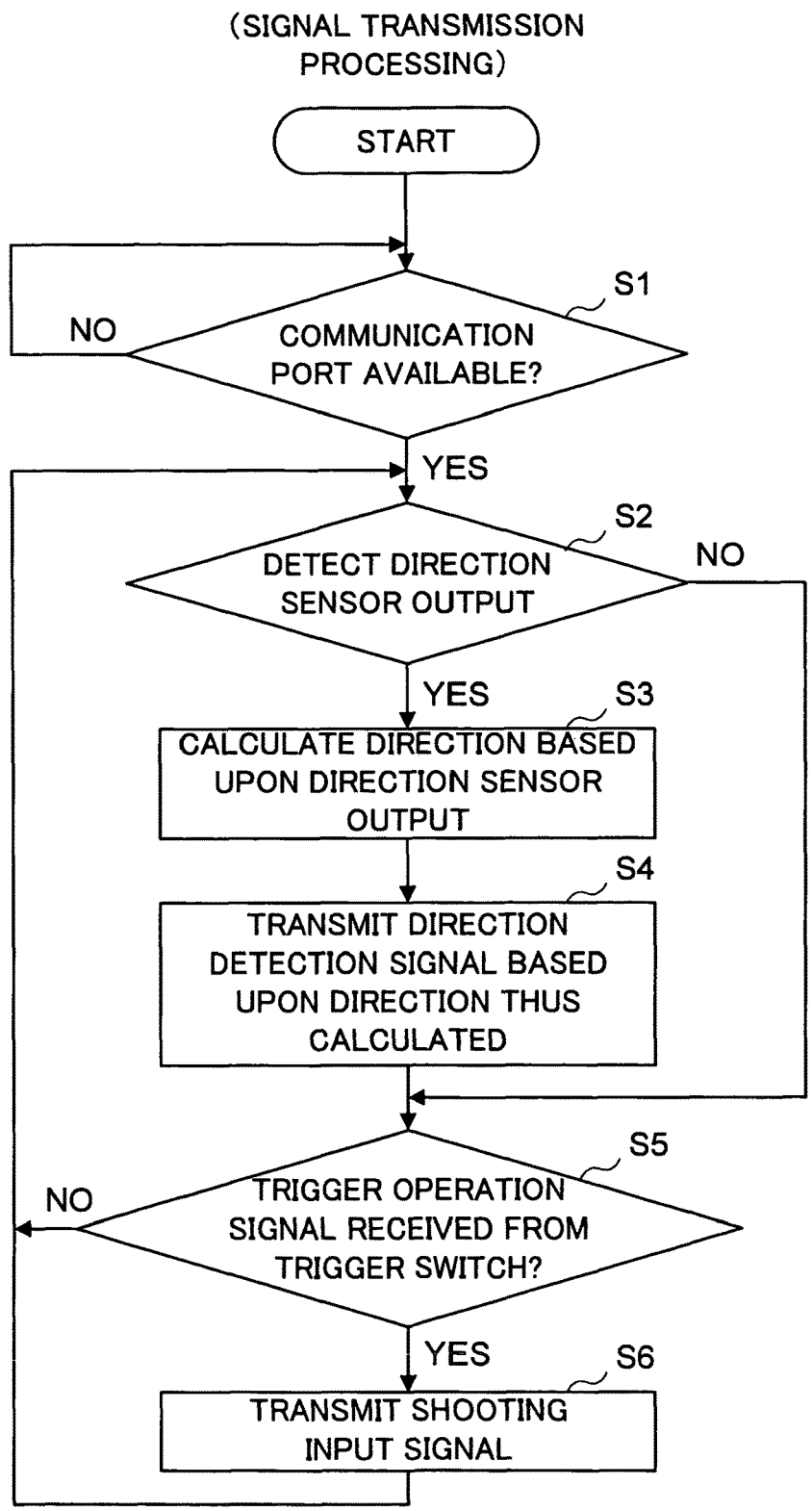
FIG. 11 is a flowchart which shows signal transmission processing.

A description will be made regarding signal transmission processing executed by the CPU 22 of the mobile game machine controller 1, with reference to the flowchart shown in FIG. 11.

First, the CPU 22 determines whether or not the communication port 9 can be used (Step S1). Specifically, the CPU 22 determines whether or not the communication port 12 of the mobile game machine 11 and the communication port 9 of the mobile game machine controller 1 are connected to each other through the communication cable 13. In a case of "YES" in this determination, the flow proceeds to Step S2. On the other hand, in a case of "NO", the flow returns to Step S1. In Step S2, determination is made whether or not output is detected by the direction sensor 10. In a case of "YES" in this determination, the flow proceeds to Step S3. On the other hand, in a case of "NO", the flow proceeds to Step S5.

In Step S3, the CPU 22 calculates the direction of the gunbarrel 6 of the mobile game machine controller 1 based upon the output signal from the direction sensor 10, and the flow proceeds to Step S4. In Step S4, the CPU 22 transmits a direction detection signal, which has been created based upon the direction thus calculated, to the communication port 12 of the mobile game machine 11 via the communication port 9. In Step S5, determination is made whether or not the CPU 22 has received an operation signal from the trigger switch 21. In a case of "YES" in this determination, the flow proceeds to Step S6. On the other hand, in a case of "NO", the flow returns to Step S2. In Step S6, the CPU 22 transmits a shooting input signal to the communication port 12 of the mobile game machine 11 via the communication port 9, and the flow returns to Step S2.

Figure 12:
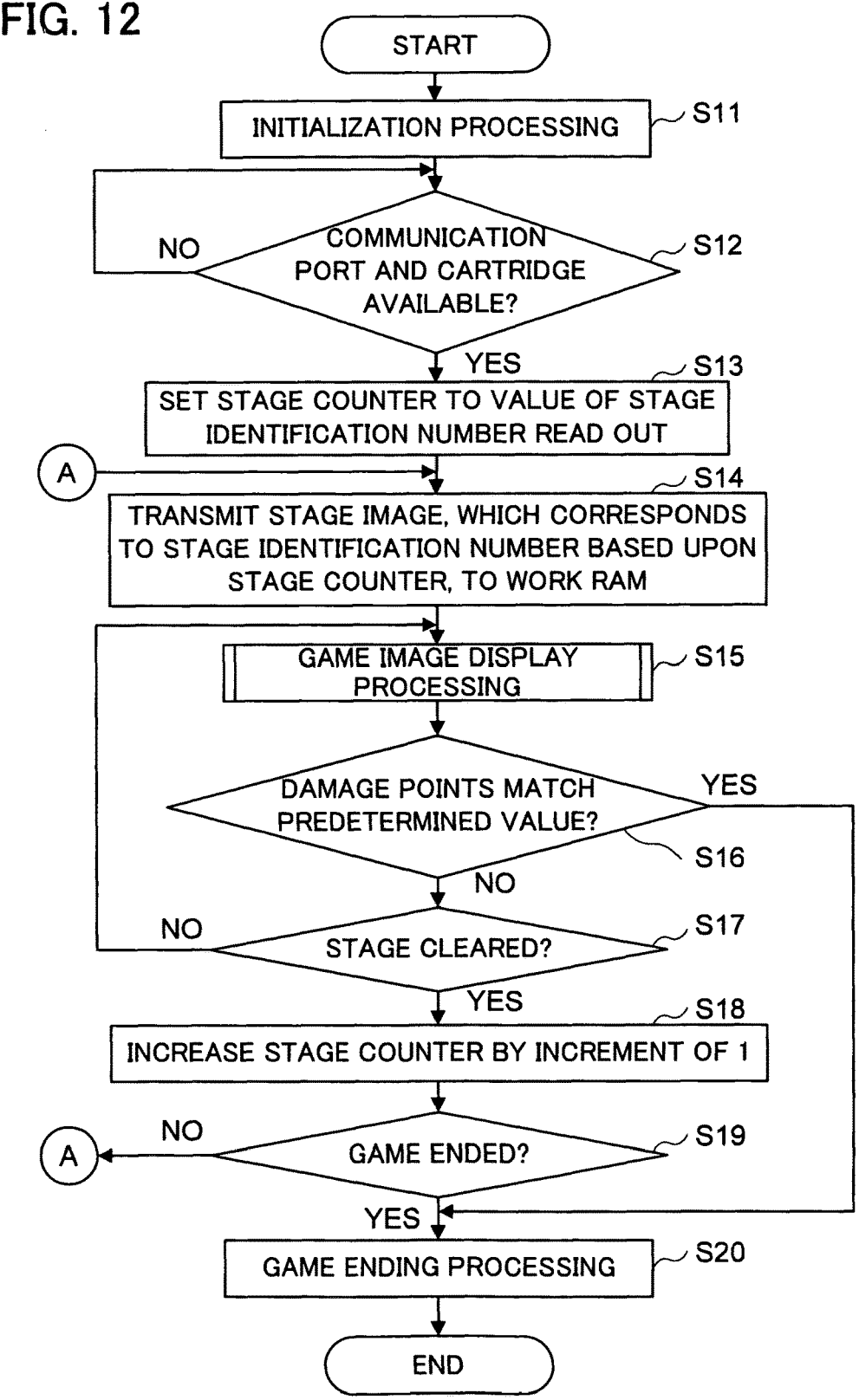
FIG. 12 is a flowchart which shows shooting game processing.

A description will be made regarding shooting game processing executed by the CPU 24 of the mobile game machine 24, with reference to the flowchart shown in FIG. 12.

First, the CPU 24 performs initialization processing (Step S11). Specifically, the CPU 24 executes processing such as initialization of the data stored in the work RAM 27, etc., according to an initialization program stored in the boot ROM 28. Subsequently, the CPU 24 determines whether or not the communication port 12 and the game cartridge 17 can be used. Specifically, the CPU 24 determines whether or not readout and writing control can be performed for the game cartridge 17, and whether or not the communication port 12 of the mobile game machine 11 and the communication port 9 of the mobile game machine controller 1 are connected to each other via the communication cable 13. In a case of "YES" in this determination, the flow proceeds to Step S13. On the other hand, in a case of "NO", the flow proceeds to Step S12.

In Step S13, the CPU 24 sets a stage counter to a value corresponding to a stage identification number read out from the ROM 25 of the game cartridge 17, and the flow proceeds to Step S14. Specifically, in Step S13, the CPU 24 sets the stage counter to a value 1 which is a stage identification number corresponding to the first stage in the shooting game. The stage counter is data which allows the current stage in the shooting game to be identified. The stage counter stores the stage identification number corresponding to the current stage.

In Step S14, the CPU 24 transmits the stage image data, which corresponds to the stage identification number set for the stage counter, to the work RAM 27, and the flow proceeds to Step S15. In Step S15, the CPU 24 performs game image display processing, which will be described later with reference to FIG. 13, and the flow proceeds to Step S16. In Step S16, the CPU 24 determines whether or not the damage points stored in a damage point counter match a predetermined value. In cases of "YES" in this determination, the flow proceeds to Step S20. On the other hand, in cases of "NO", the flow proceeds to Step S17. The damage counter is data which allows the current damage points of the player to be identified.

In Step S17, the CPU 24 determines whether or not the player has cleared the stage. Specifically, in Step S17, the CPU 24 determines whether or not the score stored in a score counter matches a predetermined value. In cases of "YES" in this determination, the flow proceeds to Step S18. On the other hand, in cases of "NO", the flow returns to Step S15. Here, the score counter is information which allows the current score of the player to be identified.

In Step S18, the stage counter is increased by an increment of 1, and the flow proceeds to Step S19. With such an arrangement, the stage counter is increased by an increment of 1, whereby the stage counter stores a stage identification number corresponding to the next stage. In Step S19, determination is made whether or not the game has ended. Specifically, a determination is made whether or not the stage identification number stored in the stage counter has reached a predetermined value, i.e., whether or not the player has cleared all the stages. In cases of "YES" in this determination, the flow proceeds to Step S20. On the other hand, in cases of "NO", the flow returns to Step S14.

Figure 13:
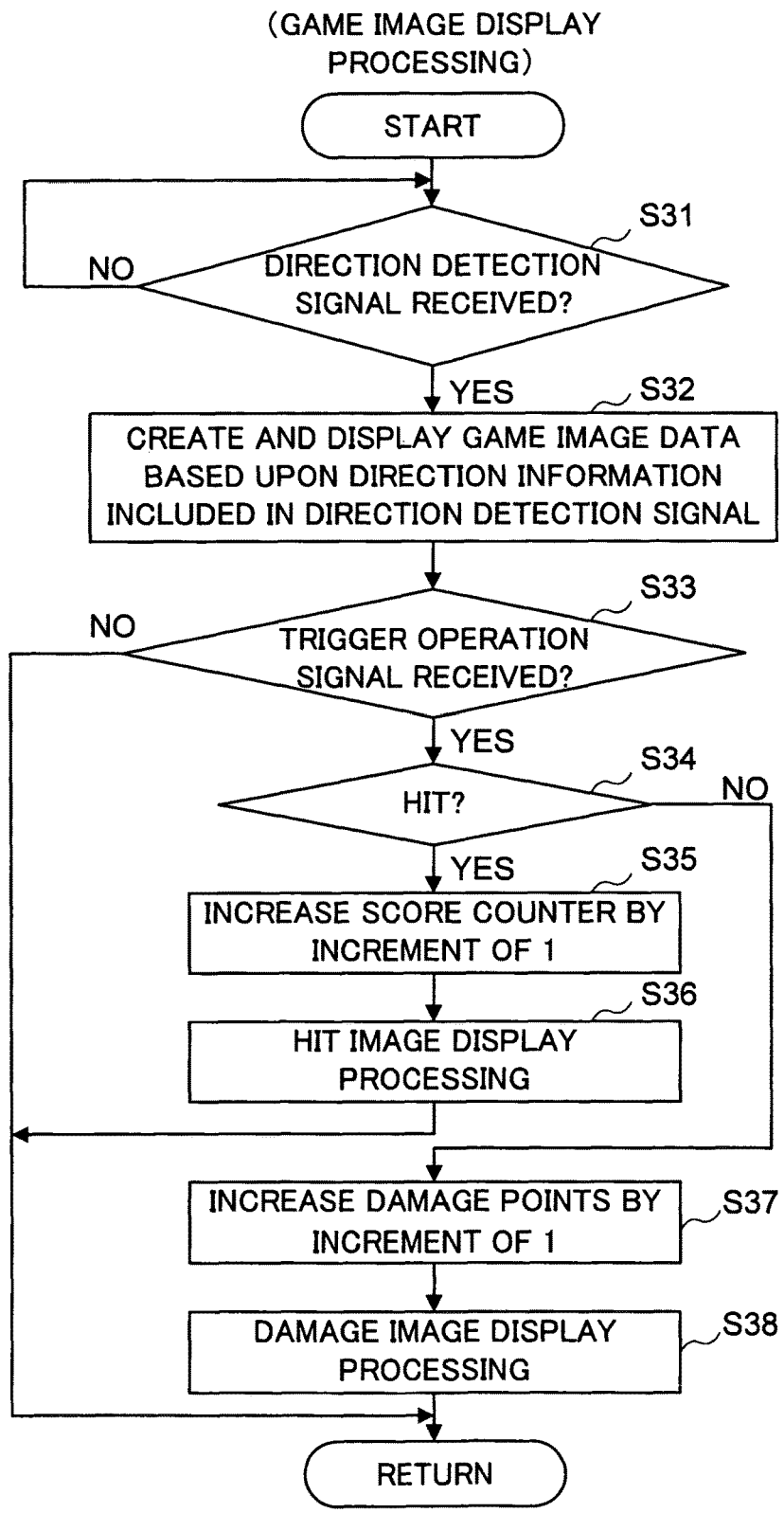
FIG. 13 is a flowchart which shows game image display processing.

A description will be made regarding the game image display processing with reference to FIG. 13.

First, determination is made whether or not the CPU 24 has received the direction detection signal from the mobile game machine controller 1 (Step S31). In cases of "YES" in this determination, the flow proceeds to Step S32. On the other hand, in a case of "NO", the flow returns to Step S31. In Step S32, the CPU 24 creates game image data, and instructs the LCD 14 to display an image corresponding to this game image data. Then, the flow proceeds to Step S33.

In Step S32, the CPU 24 creates the game image data based upon the stage image data, which is three-dimensional image data, the target image data, and the direction of the gunbarrel 6 calculated based upon the direction detection signal, and the flow proceeds to Step S33. Specifically, the CPU 24 determines the direction of the line of sight from a given point of view in a virtual three-dimensional space based upon the direction of the gunbarrel 6 calculated based upon the direction detection signal. Then, the CPU 24 projects each of the objects and the targets 15 disposed in a virtual three-dimensional space onto a plane corresponding to the aforementioned point of view, thereby creating game image data. Then, the CPU 24 instructs the LCD 14 to display an image based upon this game image data. In Step S33, a determination is made whether or not the CPU 24 has received the trigger operation signal from the mobile game machine controller 1. In cases of "YES" in this determination, the flow proceeds to Step S34. On the other hand, in a case of "NO", the flow proceeds to Step S16 shown in FIG. 12.

In Step S34, determination is made whether or not the shot is a hit. Specifically, the CPU 24 determines whether or not the shooting sight 16 is superimposed upon the target 15 in an image displayed on the LCD 14. In cases of "YES" in this determination, the flow proceeds to Step S35. On the other hand, in cases of "NO", the flow proceeds to Step S37. In Step S35, the score counter is increased by an increment of 1, and the flow proceeds to Step S36. In Step S36, the CPU 24 performs hit image display processing, and the flow proceeds to Step S16 shown in FIG. 12. Specifically, in Step S36, the CPU 24 instructs the LCD 14 to display a hit image based upon the hit image data. In Step S37, the damage point counter is increased by an increment of 1, and the flow proceeds to Step S38. In Step S38, the CPU 24 performs damage image display processing, and the flow proceeds to Step S16 shown in FIG. 12. Specifically, in this Step S38, the CPU 24 instructs the LCD 14 to display a hit image based upon the damage image data.

While description will be made regarding an arrangement according to the present embodiment, the present invention is not restricted to such an arrangement.

A description has been made in the present embodiment regarding an arrangement in which the mobile game machine controller 1 includes the direction sensor 10 comprising geomagnetic sensors or the like, and an image is displayed based upon the output of the aforementioned direction sensor 10. However, the present invention is not restricted to such an arrangement. For example, an arrangement may be made in which the acceleration of the mobile game machine controller 1 is detected by an acceleration sensor, and the mobile game machine displays an image based upon the acceleration thus detected.

Specifically, the CPU 22 transmits an acceleration detection signal, which has been created based upon the acceleration detected by the acceleration sensor, to the mobile game machine 11 via the communication port 9. The CPU 24 creates game image data based upon the acceleration detection signal, which allows a new game image to be displayed on the LCD 14. With such an arrangement, the mobile game machine displays an image which changes corresponding to the movements of the player, thereby allowing the player to aim at a target in the same manner. This can provide a game which allows the player to make the same movements as would be the case in handling a real gun. That is to say, such an arrangement can provide a game where the player experiences the feeling of having handled a real gun.

Description has been made in the present embodiment regarding an arrangement in which the game cartridge 17 is fitted to the mobile game machine controller 1, and the mobile game machine insertion portion 18 of the game cartridge 17 fitted to the mobile game machine controller 1 is inserted into the insertion opening of the mobile game machine 11, whereby the mobile game machine 11 is mounted to the mobile game machine controller 1. However, the present invention is not restricted to such an arrangement. For example, an arrangement may be made in which the game cartridge 17 and the mobile game machine controller 1 are formed in the form of a single unit. Such an arrangement allows the player to mount the mobile game machine 11 to the mobile game machine controller 1 without involving a step of fitting the game cartridge 17 to the mobile game machine controller 1. This provides a mobile game machine controller which allows a mobile game machine to be mounted thereupon by the player in a simpler manner.

A description has been made in the present embodiment regarding an arrangement in which the mobile game machine 11 displays an image which changes corresponding to the change in the direction of the gunbarrel 6 of the mobile game machine controller 1. However, the present invention is not restricted to such an arrangement. For example, an arrangement may be made in which the mobile game machine controller 1 includes an acceleration sensor for detecting the acceleration of the mobile game machine controller along the direction in which the gunbarrel 6 thereof extends, and the mobile game machine 11 displays an image corresponding to the acceleration thus detected. With such an arrangement, in cases in which that the player moves forward or backward, the mobile game machine 11 displays an image corresponding to this movement. This can provide a mobile game machine controller with a greater variety of shooting games.

A description has been made in the present embodiment regarding an arrangement in which the T-shaped groove insertion portion 19 provided to the game cartridge 17 is inserted into the T-shaped groove 4 of the mobile game machine controller 1, whereby the game cartridge 17 is mounted to the mobile game machine controller 1. However, the present invention is not restricted to such an arrangement. For example, an arrangement may be made in which other fitting portions are provided to the mobile game machine controller 1 and the game cartridge 17 instead of the T-shaped groove 4 and the T-shaped groove insertion portion 19, thereby allowing the game cartridge 17 to be mounted to the mobile game machine controller 1 through the fitting portions.

Description has been made in the present embodiment regarding an arrangement in which the communication port 9 of the mobile game machine controller 1 is connected to the communication port 12 of the mobile game machine 11 via the communication cable 13, thereby allowing the mobile game machine controller 1 to transmit signals to the mobile game machine 11. However, the present invention is not restricted to such an arrangement. For example, the mobile game machine may support other communication methods stipulated by IrDA (Infrared Data Association), IEEE802.11 (Institute of Electronic and Electronics Engineers 802.11), etc. With such an arrangement, the mobile game machine controller includes a communication port which supports the communication method thus employed, thereby allowing the mobile game machine controller to transmit signals to the mobile game machine via this communication port.

While preferred embodiments of the present invention have been described and illustrated above, it is to be understood that they are exemplary of the invention and are not to be considered to be limiting. Additions, omissions, substitutions, and other modifications can be made thereto without departing from the spirit or scope of the present invention. Accordingly, the invention is not to be considered to be limited by the foregoing description and is only limited by the scope of the appended claims.

(1) The present invention provides a game machine controller for controlling a mobile game machine (e.g., mobile game machine 11 etc., described later) including a CPU (e.g., CPU 24, etc., described later) for creating game image data (e.g., game image data, etc., described later) and a display monitor (e.g., LCD 14, etc., described later) for displaying a game image (e.g., an image which is to be displayed on the LCD 14 described later, and which includes a target 15 and a shooting sight 16 described later) based upon the game image data created by the CPU. The game machine controller comprises: an exterior portion (e.g., mobile game machine controller 1, gunbarrel 6, etc., described later) formed in the shape of a gun; a trigger (e.g., trigger 3, etc., described later) provided in the form of a part that protrudes from the exterior portion, which can be operated by a player; a signal output device (e.g., CPU 22, etc., described later) which outputs a shooting input signal (e.g., shooting input signal, etc., described later) in response to the operation of the trigger by the player; a transmission interface (e.g., communication port 9, etc., described later) which transmits the shooting input signal output from said signal output device; a locking mechanism (e.g., T-shaped groove 4, first locking mechanism, second locking mechanism, etc., described later) which is provided to the exterior portion, and which allows the mobile game machine to be fitted thereto at a predetermined position (e.g., T-shaped groove 4, etc., described later); and a direction sensor (e.g., direction sensor 10, etc., described later) which is provided within the exterior portion, and which detects the direction of the exterior portion (e.g., the direction of the gunbarrel 6, etc., described later). With such an arrangement, the signal output device transmits a direction detection signal (e.g., direction detection signal, etc., described later) to the mobile game machine via the transmission interface based upon the direction detected by the direction sensor, which allows the CPU to create game image data used for instructing the display monitor to display a new game image.

According to such an aspect of the present invention as described in (1), the direction sensor detects the direction of the exterior portion which changes corresponding to the movements of the player. On the other hand, the signal output device transmits a direction detection signal to the mobile game machine via the transmission interface based upon the direction thus detected by the aforementioned direction sensor, which allows the CPU to create game image data used for instructing the display monitor to display a new game image. With such an arrangement, the mobile game machine displays images corresponding to the movements of the player during the progress of the game, for example. This can provide a game with improved realism. Furthermore, such an arrangement provides a game with the player holding the game machine controller, to which the mobile game machine has been mounted, by hand. This can provide a game without restricting the player's range of movement while controlling the game machine controller, thereby improving the feel of the game. Furthermore, with such an arrangement, the mobile game machine and the game machine controller are provided in the form of separate units. This can provide a game machine controller having a function of mounting multiple kinds of mobile game machines, unlike a game machine controller connected to a particular game machine.

(2) The present invention provides a game machine controller for controlling a mobile game machine (e.g., mobile game machine 11 etc., described later) including a CPU (e.g., CPU 24, etc., described later) for creating game image data (e.g., game image data, etc., described later) and a display monitor (e.g., LCD 14, etc., described later) for displaying a game image (e.g., an image which is to be displayed on the LCD 14 described later, and which includes a target 15 and a shooting sight 16 described later) based upon the game image data created by the CPU. The game machine controller comprises: an exterior portion (e.g., mobile game machine controller 1, gunbarrel 6, etc., described later) formed in the shape of a gun; a trigger (e.g., trigger 3, etc., described later) provided in the form of a part that protrudes from the exterior portion, which can be operated by a player; a signal output device (e.g., CPU 22, etc., described later) which outputs a shooting input signal (e.g., shooting input signal, etc., described later) in response to the operation of the trigger by the player; a transmission interface (e.g., communication port 9, etc., described later) which transmits the shooting input signal that is output from the signal output device; a locking mechanism (e.g., T-shaped groove 4, first locking mechanism, second locking mechanism, etc., described later) which is provided to the exterior portion, and which allows the mobile game machine to be fitted thereto at a predetermined position (e.g., T-shaped groove 4, etc., described later); and an acceleration sensor (e.g., acceleration sensor, etc, described later) which is provided within the exterior portion, and which detects the acceleration of the exterior portion (e.g., the acceleration of the gunbarrel 6, etc., described later). With such an arrangement, the signal output device transmits an acceleration detection signal (e.g., acceleration detection signal, etc., described later) to the mobile game machine via the transmission interface based upon the acceleration detected by the acceleration sensor, which allows the CPU to create game image data used for instructing the display monitor to display a new game image.

According to such an aspect of the present invention as described in (2), the acceleration sensor detects the acceleration of the exterior portion which changes corresponding to the movements of the player. On the other hand, the signal output device transmits an acceleration detection signal to the mobile game machine via the transmission interface based upon the acceleration thus detected by the aforementioned acceleration sensor, which allows the CPU to create game image data used for instructing the display monitor to display a new game image. With such an arrangement, the image data is controlled based upon the change in the acceleration, whereby the mobile game machine displays images corresponding to the movements of the player during the progress of the game, for example. This can provide a game with improved realism. Furthermore, such an arrangement provides a game with the player holding the game machine controller, to which the game machine has been mounted, by hand. This can provide a game without restricting the player's range of movement while controlling the game machine controller, thereby improving the feel of the game. Furthermore, with such an arrangement, the mobile game machine and the game machine controller are provided in the form of separate units. This can provide a game machine controller which mounts multiple kinds of game machines, unlike a game machine controller connected to a particular mobile game machine.

(3) With a game machine controller described in (1), the locking mechanism is configured so as to mount a game cartridge (e.g., game cartridge 17, etc., described later) which stores a game program that is to be executed by the mobile game machine, which can be inserted into an insertion opening provided to the mobile game machine (e.g., insertion opening provided to the mobile game machine 11, etc., described later), and which can be fitted to the exterior portion.

According to such an aspect of the present invention as described in (3), such an arrangement allows the cartridge to be mounted to the exterior portion of the game machine controller, and allows this game cartridge to be inserted into the insertion opening provided to the mobile game machine. Such an arrangement allows the mobile game machine to be mounted to the game machine controller at the same time that the game cartridge is inserted into the insertion opening of the mobile game machine, which is required step for executing a game on the mobile game machine. This can provide a game machine controller to which the mobile game machine can be mounted in a simple manner.

(4) With a game machine controller described in (1), a game cartridge (e.g., game cartridge 17, etc., described later), which stores a game program that is to be executed by the mobile game machine, and which can be inserted into an insertion opening provided to the mobile game machine (e.g., insertion opening provided to the mobile game machine 11, etc., described later), is fixed to the exterior portion.

According to such an aspect of the present invention as described in (4), such an arrangement allows the game cartridge fixed to the exterior portion of the game machine controller to be inserted into the insertion opening provided to the mobile game machine. Such an arrangement allows the mobile game machine to be mounted to the game machine controller at the same time that the game cartridge is inserted into the insertion opening of the mobile game machine, which is a required step for executing a game on the mobile game machine. This can provide a game machine controller to which the mobile game machine can be mounted in a simple manner.

(5) With a game machine controller described in (3), the locking mechanism is provided to the exterior portion, and includes a holding portion (e.g., swing plates 8a and 8b, etc., described later) having a holding member (e.g., clips 7a and 7b, etc., described later) for holding the mobile game machine. With such an arrangement, the holding member allows the mobile game machine to be held with the game cartridge having been inserted into the insertion portion.

According to such an aspect of the present invention described in (5), the holding portion provided to the exterior portion of the game machine controller holds the mobile game machine with the game cartridge having been fitted to the exterior portion, and being inserted into the insertion portion of the mobile game machine. This can provides a game machine controller which grips both ends of the mobile game machine, thereby effectively fixing the mobile game machine to the game machine controller without the mobile game machine becoming detached therefrom and falling out, which is a problem that easily arises as a result of the movements of the player.

According to the present invention, the direction sensor detects the direction of the exterior portion which changes corresponding to the movements of the player. Then, the signal output device transmits a direction detection signal to the mobile game machine via the transmission interface, which allows the CPU to create game image data used for instructing the display monitor to display a new game image. With such an arrangement, the mobile game machine displays an image corresponding to the movements of the player during the progress of the game, for example. This provides a game with improved realism. Furthermore, such an arrangement provides a game with the player holding the game machine controller, to which the mobile game machine has been mounted, in the player's hand. This can provide a game without restricting the player's range of movement while controlling the game machine controller, thereby improving the feel of the game.

What is claimed is:

1. A game controller for controlling a game machine including a CPU for creating game image data, and a display monitor for displaying a game image including three-dimensional image data based upon the game image data created by the CPU, said game controller comprising:
an exterior portion formed in the shape of a gun;
a trigger provided in the form of a part that protrudes from said exterior portion, which can be operated by a player;
a signal output device which outputs a shooting input signal in response to the operation of said trigger by said player;
a transmission interface which transmits the shooting input signal output from said signal output device;
a direction sensor which detects a direction of said exterior portion; and
a locking mechanism which fixes the game machine to a predetermined position,
wherein said signal output device transmits a direction detection signal, which allows new game image data in which the three-dimensional image data are changed to be displayed in the display monitor, to said game machine via said transmission interface based upon a change of the direction detected by said direction sensor, and
wherein said locking mechanism is configured so as to mount a game cartridge which stores a game program that is to be executed by said game machine, which can be inserted into an insertion opening provided to said game machine, and which can be fitted to said exterior portion.

2. A game controller for controlling a game machine including a CPU for creating game image data, and a display monitor for displaying a game image including three-dimensional image data based upon the game image data created by the CPU, said game controller comprising:
an exterior portion formed in the shape of a gun;
a trigger provided in the form of a part that protrudes from said exterior portion, which can be operated by a player;
a signal output device which outputs a shooting input signal in response to the operation of said trigger by said player;
a transmission interface which transmits the shooting input signal that is output from said signal output device;
an acceleration sensor which detects an acceleration of said exterior portion; and
a locking mechanism which fixes the game machine to a predetermined position,
wherein said signal output device transmits an acceleration detection signal, which allows new game image data in which the three-dimensional image data are changed to be displayed in the display monitor, to said game machine via said transmission interface based upon a change of the acceleration detected by said acceleration sensor, and
wherein said locking mechanism is configured so as to mount a game cartridge which stores a game program that is to be executed by said game machine, which can be inserted into an insertion opening provided to said game machine, and which can be fitted to said exterior portion.

3. The game controller according to claim 1, wherein said locking mechanism is provided to said exterior portion, and includes a holding portion having a holding member for holding said game machine,
and wherein said holding member allows said game machine to be held with said game cartridge having been inserted into said insertion portion.

4. The game controller according to claim 1, wherein the three-dimensional image data include at least one of stage image data including data arranged in a three-dimensional space and target image data.

5. The game controller according to claim 1, wherein the CPU of the game machine determines a direction of a line of sight from a given point of view in a virtual three-dimensional space based on a direction obtained from the direction detection signal received from the game controller, and generates the game image data corresponding to an image obtained by projecting an object viewed from the point of view onto a plane.

6. A game system comprising:
a game machine including a CPU for creating game image data, and a display monitor for displaying a game image including three-dimensional image data based upon the game image data created by the CPU; and
a game controller for controlling the game machine,
wherein the game controller comprising:
an exterior portion;
an operation unit provided in the exterior portion, which can be operated by a player;
a signal output device which outputs an input signal in response to an operation of the operation unit by the player;
a transmission interface which transmits the input signal output from the signal output device;
a direction sensor which detects a direction of the exterior portion; and
a locking mechanism which fixes the game machine to a predetermined position,
wherein the signal output device transmits a direction detection signal, which allows new game image data in which the three-dimensional image data are changed to be displayed in the display monitor, to the game machine via the transmission interface based upon a change of the direction detected by the direction sensor,
wherein the CPU determines a direction of a line of sight from a given point of view in a virtual three-dimensional space based on a direction obtained from the direction detection signal received from the game controller, and generates the game image data corresponding to an image obtained by projecting an object viewed from the point of view onto a plane, and
wherein said locking mechanism is configured so as to mount a game cartridge which stores a game program that is to be executed by said game machine, which can be inserted into an insertion opening provided to said game machine, and which can be fitted to said exterior portion.

7. A game machine controlled by a game controller including an operation unit which can be operated by a player, a signal output device which outputs an input signal in response to an operation of the operation unit by the player, and a transmission interface which transmits the input signal output from the signal output device, the game machine comprising:

a CPU which creates game image data; and
a display monitor which displays a game image including three-dimensional image data based upon the game image data created by the CPU,
wherein the game controller further includes a direction sensor which detects a direction of the game controller, and transmits a direction detection signal, which allows new game image data in which the three-dimensional image data are changed to be displayed in the display monitor, to the game machine via the transmission interface based upon a change of the direction detected by the direction sensor, and a locking mechanism which fixes the game machine to a predetermined position,
wherein said locking mechanism is configured so as to mount a game cartridge which stores a game program that is to be executed by said game machine, which can be inserted into an insertion opening provided to said game machine, and which can be fitted to said exterior portion, and
wherein the CPU determines a direction of a line of sight from a given point of view in a virtual three-dimensional space based on a direction obtained from the direction detection signal received from the game controller, and generates the game image data corresponding to an image obtained by projecting an object viewed from the point of view onto a plane.

8. A game controller for controlling a mobile game machine including a memory for storing game image data, a CPU for creating the game image data from the memory, and a display monitor for displaying a game image including three-dimensional image data based upon the game image data created by the CPU, the game controller comprising:
an exterior portion formed in the shape of a gun;
a trigger provided in the form of a part that protrudes from the exterior portion, which can be operated by a player;
a signal output device which outputs a shooting input signal in response to an operation of the trigger by the player to the mobile gaming machine;
a transmission interface which transmits the shooting input signal output from the signal output device;
a direction sensor which detects a direction of the exterior portion; and
a locking mechanism which fixes the mobile game machine that is provided in a separate unit from the game controller to a predetermined position,
wherein the direction sensor detects the direction of the exterior portion which changes according to a movement of the player holding the game controller to which the mobile game machine is fixed, and
wherein the signal output device transmits to the game machine a direction detection signal which allows new game image data, in which the three-dimensional image data are changed based upon a change of the direction detected by the direction sensor, to be displayed in the display monitor of the game machine via the transmission interface.

9. The game controller according to claim 8, wherein the mobile game machine further includes an operation unit which outputs an operation signal in response to an operation by the player,
wherein the CPU of the mobile game machine creates the game image data stored in the memory in accordance with at least one of the direction detection signal, the shooting input signal, and the operation signal from the game controller, and displays the game image data in the display monitor.

10. A game system comprising:
a mobile game machine comprising
a memory which stores game image data,
a CPU which creates the game image data from the memory,
a display monitor which displays a game image including three-dimensional image data based upon the game image data created by the CPU,
an operation unit which outputs an operation signal in response to an operation by a player; and
a game controller that is provided in a separate unit from the mobile game machine, the game controller comprising,
an exterior portion,
a direction sensor which detects a direction of the exterior portion, and
a transmission interface which transmits a direction detection signal detected by the direction sensor to the mobile game machine,
wherein the game controller fixes the mobile game machine to a predetermined position of exterior portion,
wherein the game controller detects, by the direction sensor, the direction of the exterior portion which changes according to a movement of the player holding the game controller to which the mobile game machine is fixed, and transmits, by the transmission interface, to the game machine a direction detection signal which allows new game image data, in which the three-dimensional image data are changed based upon a change of the direction detected by the direction sensor, to be displayed in the display monitor of the game machine, and
wherein the mobile game machine creates the game image data stored in the memory in accordance with at least one of the direction detection signal from the game controller and the operation signal from the operation unit of the mobile game machine, and displays the game image data in the display monitor.

11. A game system comprising:
a memory which stores game image data;
a CPU which creates the game image data from the memory;
a display monitor which displays a game image including three-dimensional image data based upon the game image data created by the CPU;
a first game controller which outputs an operation signal in response to an operation by a player; and
a second game controller which is different from the first game controller, and includes a direction sensor which detects a direction that changes according to a movement of the player holding the second game controller to output a direction detection signal,
wherein the CPU displays in the display monitor new game image data in which the three-dimensional image data are changed based upon a change of the direction detected by the direction sensor, and creates the game image data stored in the memory in accordance with at least one of the operation signal from the first game controller and the direction detection signal from the second game controller, and displays the game image data in the display monitor.

12. A game controller for controlling a mobile game machine including a memory for storing game image data including a target image at which a player is to aim and a shooting sight image used for aiming at the target image, a CPU for creating the game image data from the memory, and a display monitor for displaying a game image including three-dimensional image data based upon the game image data created by the CPU, the game controller comprising:
- an exterior portion formed in the shape of a gun;
- a trigger provided in the form of a part that protrudes from the exterior portion, which can be operated by a player;
- a signal output device which outputs a shooting input signal in response to an operation of the trigger by the player;
- a transmission interface which transmits the shooting input signal output from the signal output device to the mobile game machine;
- a direction sensor which detects a direction of the exterior portion; and
- a locking mechanism which fixes the mobile game machine that is provided in a separate unit from the game controller to a predetermined position,
- wherein the direction sensor detects the direction of the exterior portion which changes according to a movement of the player holding the game controller to which the mobile game machine is fixed, and
- wherein the signal output device transmits to the game machine a direction detection signal which allows new game image data, in which the three-dimensional image data are changed based upon a change of the direction detected by the direction sensor, to be displayed in the display monitor of the game machine via the transmission interface so that the shooting sight image aligns with the target image in the display monitor.

* * * * *